United States Patent
Gill et al.

(10) Patent No.: US 7,277,645 B2
(45) Date of Patent: Oct. 2, 2007

(54) HIGH-BIT-RATE LONG-HAUL FIBER OPTIC COMMUNICATION SYSTEM TECHNIQUES AND ARRANGEMENTS

(75) Inventors: Douglas M Gill, South Orange, NJ (US); Xiang Liu, Marlboro, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 901 days.

(21) Appl. No.: 10/099,077

(22) Filed: Mar. 14, 2002

(65) Prior Publication Data

US 2004/0208429 A1  Oct. 21, 2004

(51) Int. Cl.
*H04B 10/04* (2006.01)
(52) U.S. Cl. .................... 398/185; 398/187
(58) Field of Classification Search ........... 398/188, 398/189, 182, 185, 187
See application file for complete search history.

(56) References Cited

U.S. PATENT DOCUMENTS

| | | | | |
|---|---|---|---|---|
| 6,525,857 | B1* | 2/2003 | Way et al. | 398/192 |
| 6,763,197 | B1* | 7/2004 | Hirano et al. | 398/192 |
| 6,781,741 | B2* | 8/2004 | Uesaka | 359/279 |
| 2002/0005975 | A1* | 1/2002 | Nakamoto | 359/254 |
| 2002/0109893 | A1* | 8/2002 | Givehchi | 359/181 |
| 2002/0191262 | A1* | 12/2002 | Yamada et al. | 359/183 |
| 2003/0058504 | A1* | 3/2003 | Cho et al. | 359/161 |
| 2003/0147116 | A1* | 8/2003 | Shpantzer et al. | 359/264 |
| 2003/0156774 | A1* | 8/2003 | Conradi | 385/2 |
| 2003/0175036 | A1* | 9/2003 | Mamyshev et al. | 398/188 |
| 2004/0081470 | A1* | 4/2004 | Griffin | 398/188 |

OTHER PUBLICATIONS

Ohirra, R; Ogasahara, D. and Ono, T: "Novel RZ Signal format with Alternate-chirp for Suppression of Nonlinear Degradation in 40 Gb/s based WDM," Optical Fiber Communication Conference and Exhibit, 2001. OFC 2001 vol. 3, 2001 pp. WM2-1-WM2-3 vol. 3.*

* cited by examiner

*Primary Examiner*—Kenneth Vanderpuye
*Assistant Examiner*—Ken Malkowski (57) ABSTRACT

A 90 degree Alternate-Phase (AP) on-off keying (OOK) transmission format for high bit rate, long-haul optical transmission systems employing a chirped or a chirp-free pulse stream generated by a pulse generator (e.g., Mach Zehnder modulator) driven by mixing two electrical signals—one for intensity modulation and another for pulse modulation. These electrical signals may be two properly skewed sinusoidal electrical signals at half the desired data rate thereby generating a pulse stream in which the maximum optical phase modulation occurs at the intensity peak of each pulse and is 90 degrees out of phase with its nearest neighbors.

7 Claims, 9 Drawing Sheets

70 GHz 3rd ORDER GAUSSIAN FILTERED
90 DEGREE AP OOK DATA STREAM

FIG. 9B

70 GHz 3rd ORDER GAUSSIAN
FILTERED RZ OOK DATA STREAM

HIGH-BIT-RATE LONG-HAUL FIBER OPTIC COMMUNICATION SYSTEM TECHNIQUES AND ARRANGEMENTS

TECHNICAL FIELD

The present invention relates generally to optical communication arrangements, and, in particular, to an arrangement and method for generating a stream of 90 degree alternate phase (AP) optical pulses and their application for transmitting information in long haul communication systems, including wavelength division multiplexing (WDM) systems.

BACKGROUND OF THE INVENTION

High-capacity long-haul transmission at low cost is of crucial importance to meet the ever-increasing demand in optical communications. Designing long-haul (e.g., designed for distances in excess of 1000 km) dense wavelength-division-multiplexed (DWDM) systems is a means to achieve high capacity and low cost. However, many of the current high bit rate (e.g., with data rates of 40 Gb/s) DWDM systems use a pseudo linear transmission format called return to zero (RZ) on-off keying (OOK) transmission, in which the presence or absence of light to convey information, e.g. a digital "one" is represented by the presence of an optical pulse and a "zero" is represented by the absence of a pulse. These systems suffer from various non-linear transmission penalties, such as intra-channel cross-phase modulation (XPM) and intra-channel four wave mixing (FWM), the latter of which results in the amplitude fluctuation in "1s" and the generation of ghost pulses through energy transfers from "1s" to "0s". These effects undesirably limit the ultimate reach of the system.

While intra-channel XPM can be effectively suppressed by optimum dispersion management, intra-channel FWM remains a limiting nonlinear penalty in long-haul high-bit-rate transmission, despite various attempts that have been made to deal with that effect. For example, different signaling or modulation formats, such as return to zero (RZ), carrier-suppressed RZ (CS-RZ), chirped RZ (C-RZ), modified duo-binary, etc., have been suggested. Unfortunately, however, these attempts have not met realistic commercial needs, due, in part to problems associated not just with performance limitations, but also with expense, and implementation difficulty. For example, one approach to suppressing ghost pulse generation is to use duobinary and modified duobinary formats. However, that approach is not optimal, because the implementation of these transmission formats generally requires either complicated electronics or extra optical component hardware on the transmitter side of the transmission link.

SUMMARY OF THE INVENTION

In accordance with the present invention, a 90 degree AP on-off keying (OOK) transmission format is used to suppress intra-channel FWM and significantly extend reach in high bit rate, long-haul fiber optic transmission systems. Advantageously, the pulse stream with the aforementioned format can be either chirped or chirp-free.

In accordance with an aspect of the present invention, the 90 degree AP pulse train is created with a pulse generator by mixing two electrical signals. One of the electrical signals is used to create an intensity modulation and the other a phase modulation in the pulse generator. This can be done, for example, with a Mach-Zehnder (MZ) modulator driven by two properly skewed, preferably sinusoidal, electrical signals at half of the desired data rate. The phase modulation produced, using the proper configuration, creates a pulse stream in which the maximum optical phase modulation preferably occurs at the intensity peak of each pulse and is 90 degrees out of phase with its nearest neighbors.

In accordance with another aspect of the present invention, the 90 degree AP pulse train is generated by a single phase modulator followed by a delay interferometer with a time delay of approximately ⅔ of the bit period of the data in the data stream.

In accordance with yet another aspect of the present invention, the chirped 90 degree AP pulse generator can be used with an appropriate optical filter to create a 'phase flattened', or nearly chirp free 90 degree AP pulse stream. The total pulse generator and filter configuration will be referred to as a chirp free, or phase flattened, 90 degree AP-PG.

BRIEF DESCRIPTION OF THE DRAWINGS

The present invention will be more fully appreciated by consideration of the following detailed description, which should be read in light of the accompanying drawing in which.

DETAILED DESCRIPTION

In accordance with the present invention, for reasons that are described more fully below, we have found that significant benefit can be derived, in terms of reducing the effects of intra-channel FWM, by creating and using a transmission format in which neighboring pulses are 90 degrees out of phase with each other. A transmitter or pulse generator can achieve simultaneous intensity and phase modulation of an optical carrier signal using several different configurations. First, a chirp free intensity modulator can to be used, followed by a phase modulator, i.e. cascading devices. Secondly, appropriate intensity and phase modulation can be created in a balanced MZ modulator design by appropriately mixing electrical inputs for phase and intensity modulation to get the desired effect. Finally, a chirped modulator can simultaneously create intensity and phase modulation in the resulting pulse stream. Each of these arrangements will be described in turn. However, before doing so, a brief background concerning MZ modulators and their use as pulse generators, will be helpful.

Pulse carving, i.e., generation of a pulse stream from a CW laser signal, can be accomplished by driving a Mach-Zehnder (MZ) electro-optic modulator with twice the required switching voltage ($2*V_\pi$) and at a frequency that is half the data rate f=(B/2), where $V_\pi$ is the switching voltage, B is the bit rate, and f is the preferably sinusoidal drive frequency. We will hereafter refer to a modulator operated in this mode as a 2V-PG. In addition to the 2V-PG configuration, a pulse generator can also be realized by driving a MZ modulator with a microwave input that repeats at the data rate and with a drive voltage of $V_\pi$. We will hereafter refer to a modulator operated in this mode as a 1V-PG.

MZ modulators used as pulse generators are typically operated with equal and synchronous microwave power seen on each arm of the MZ modulator, however the optical phase shifts in each arm resulting from the input drive waveform(s) have opposite polarity. In such a mode of operation the optical pulse stream at the output of the modulator is typically chirp free.

Chirp can be created in a number of ways in MZ modulators used as pulse generators. Fundamental MZ modulator response issues that create chirp include an unequal RF drive signal and a temporal misalignment (signal skew) of the microwave drive waveform in each arm of the MZ modulator. Note that a drive power imbalance and/or temporal skew in a 2V-PG will only increase the required drive voltage of the modulator, but will not impact the output pulse intensity envelope in any other way.

The response of a 2V-PG with equal optical splitting ratios in each optical coupler and equal microwave drive power seen on each arm of the MZ modulator is characterized by the following analytic expression for both the intensity and chirp output of the modulator. We also assume the temporal skew (or drive phase misalignment) on each arm is in equal and opposite directions from the reference phase, the modulator response is given as:

$$E_{out}=e^{iA\ \sin\ \delta\ \cos\ \Omega t}* \cos[A \cos \delta \sin \Omega t+\phi] \quad (1)$$

where $\delta$ is the amount of phase misalignment in each arm of the MZ modulator from a given reference point, A is representative of the amplitude of the sinusoidal drive voltage, $\phi$ is a phase term which represents the DC bias applied to the modulator, and $\Omega=2\pi*f$ is the sinusoidal angular drive frequency used. Note that equation (1) assumes that with no signal skew ($\delta=0$), the sinusoidal phase modulation created in each arm of the MZ modulator is 180° out of phase with each other. The $e^{iA\ \sin\ \delta\ \cos\ \Omega t}$ term represents the chirp from the modulator. The $\cos[A \cos \delta \sin \Omega t+\phi]$ term represents the intensity envelope of the output pulse train, but can also impact the optical phase of the pulse train, namely, if this term changes from positive to negative a $\pi$ phase shift will be seen in the output of the modulator. From this analytic expression one can fully characterize the expected response of the 2V-PG described above.

Alternately, if one operates, or designs, a modulator such that there is an unequal amount of microwave drive power seen on each arm of the MZ modulator, then the modulator is referred to as a chirped modulator. A chirped modulator is a device in which the optical path length through the device changes as a function of the applied voltage. So, in essence, the phase of the optical output is also a function of the applied voltage. Therefore one can configure, or design, such a device to simultaneously create optical intensity and phase modulation. The optical phase change of the MZ modulator output can be characterized by the average of the phase changes in each arm of the MZ modulator and is given as:

$$\Delta\Phi_{modulator}=(\Delta\Phi_{MZM1}+\Delta\Phi_{MZM2})/2 \quad (2)$$

where $\Delta\Phi_{MZM1}$ represents the optical phase change in one arm of the MZ modulator, $\Delta\Phi_{MZM2}$ represents the optical phase change in the other arm of the MZ modulator, and $\Delta\Phi_{modulator}$ represents the optical phase change of the output of the modulator.

If the modulator is operated such that there is an equal and opposite phase change in both arms of the modulator ($\Delta\Phi_{MZM1}=-\Delta\Phi_{MZM2}$) and no temporal skew ($\delta=0$) between the microwave drive waveforms on each arm of the MZ modulator, equation (1) simplifies to:

$$E_{out}= \cos[A \sin(\Omega t+\Phi)]. \quad (3)$$

There are two potential modes of operation for the 2V-PG pulse generator described by equation (3), the 33% and 67% duty cycle operation, in which A=$\pi$ for both modes. In the 33% duty cycle mode, where the $\phi$ term can equal 0 for example, the 2V-PG creates a pulse stream in which all pulses have the same phase. However, in the 67% duty cycle mode, the $\phi$ term can equal $-\pi/2$ for example, and the phase of each pulse within the pulse stream alternates by 180 degrees. This is because the cosine term changes sign during the cycle of the microwave drive waveform.

Figure 1:
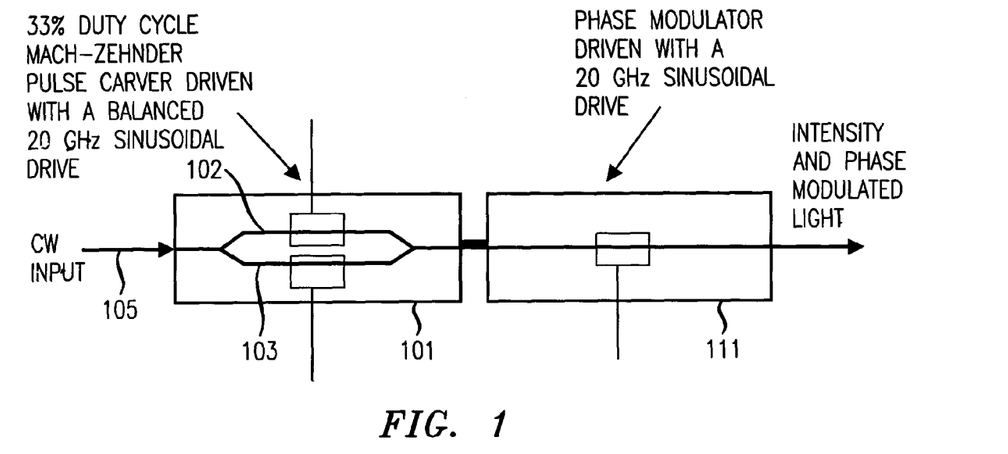
FIG. 1 is a schematic diagram of a chirp free Mach-Zehnder modulator cascaded with a phase modulator in order to achieve simultaneous intensity and phase modulation in accordance with the principles of the present invention.

Referring now to FIG. 1, there is illustrated an arrangement for a 90 degree AP pulse generator using two modulators, one of which may be a Mach-Zehnder (MZ) modulator 101 used for pulse carving, and a second of which is a modulator 111 used for phase modulation. While, as indicated above, it is generally known that properly designed and driven MZ modulators can achieve simultaneous intensity and phase modulation, this has conventionally been done to create pulse streams in which each pulse either has the same phase as its nearest neighbors, or has a phase that is 180° out of phase with it nearest neighbor. Until the present invention was made, it was not appreciated a 90 degree AP OOK transmission format can significantly reduce nonlinear transmission penalty caused by FWM and thereby increase system reach.

Figure 2A:
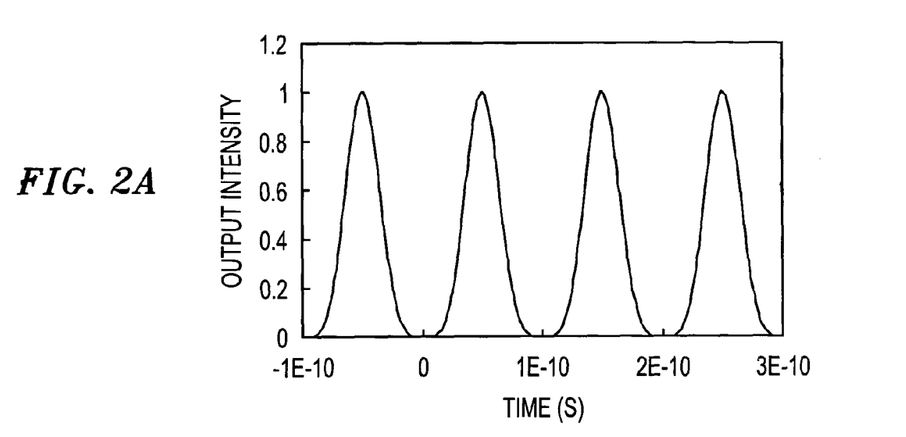
FIGS. 2A and 2B illustrate the output intensity and phase of a 90 degree AP pulse train resulting from simultaneous intensity and phase modulation using the arrangement of FIG. 1.
Figure 2B:
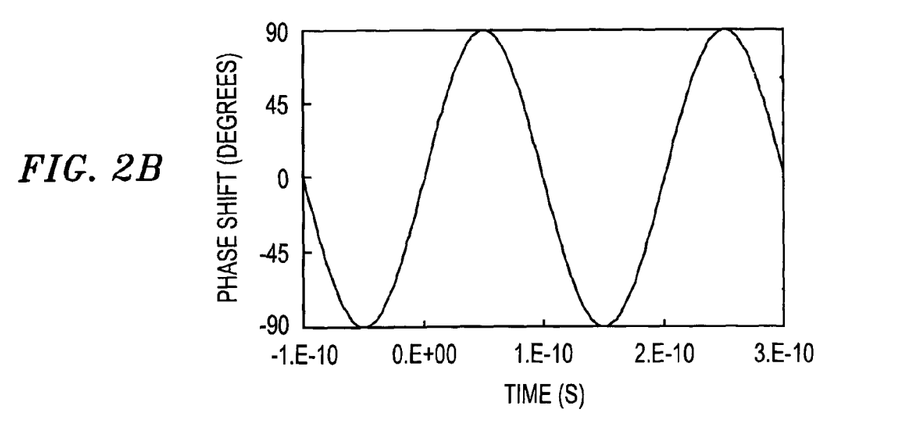

In the arrangement of FIG. 1, a continuous wave (CW) signal, illustratively having a wavelength of 1.5 microns, is applied to input 105 of the Mach-Zehnder modulator 101, which acts as a chirp-free pulse generator. The arms 102, 103 of the MZ modulator 101 each receive a balanced drive signal having a frequency that is at half of data rate, in this example 20 GHz. One of the drive signals is the inverse of the other (i.e., one of the signals is 180 degrees out of phase with respect to the other), so that the output of modulator 101, as shown in FIG. 2a, is a stream of pulses having equal intensity, a 33% duty cycle, and no inter-pulse phase shift. This signal is applied to modulator 111, which is a phase modulator that imparts a 20 GHz sinusoidal phase modulation (chirp) to the pulse stream. Given the proper amount of phase modulation, the output of modulator 111 is, as shown in FIG. 2b, a 90 degree AP pulse train in which the maximum phase shift coincides with the pulse intensity peak. While the example in FIG. 1 uses a 33% duty cycle 2V-PG based scheme, it is to be noted that a similar technique will also work well with a 67% duty cycle pulse generator.

Figure 3:
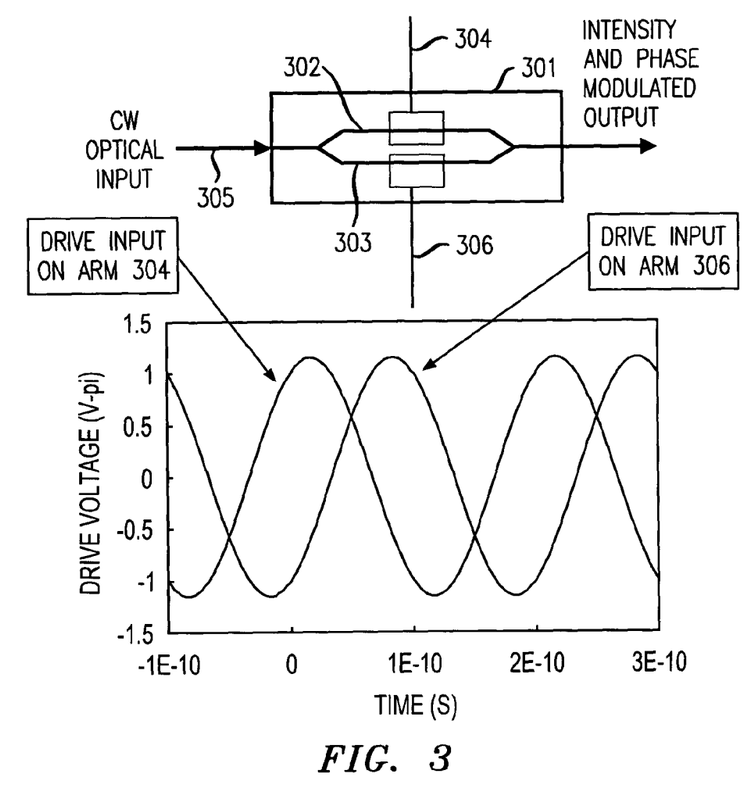
FIG. 3 is a diagram illustrating the microwave phase misalignment between the two arms of a 33% duty cycle Mach-Zehnder modulator that can be used as a pulse generator to create a 90 degree AP pulse train in accordance with the present invention.

As an alternative to having separate phase and intensity modulators create the appropriate intensity and phase modulation as shown in FIG. 1, in accordance with the present invention, a single pulse generator can be arranged to simultaneously modulate both intensity and phase of a CW signal. For example, as shown in FIG. 3, a 33% duty cycle configured MZM pulse generator 301 can receive a CW input on input line 305, and have two arms 302 and 303 that are respectively driven with sinusoidal drive signals applied on lines 304 and 306 that have a temporal skew. An approximately 60 degree phase skew (i.e., an intentional misalignment) between the sinusoidal drive signals applied to each arm 302, 303 of the MZM pulse generator (with a ~15% increase in drive voltage) creates the appropriate 90 degree phase shift between adjacent pulses. The 60 degree phase misalignment or delay in the drive signal applied to lines 304 and 306 can be achieved with either an electrical delay or an optical delay between the two drive modulated optical signals.

Figure 4:
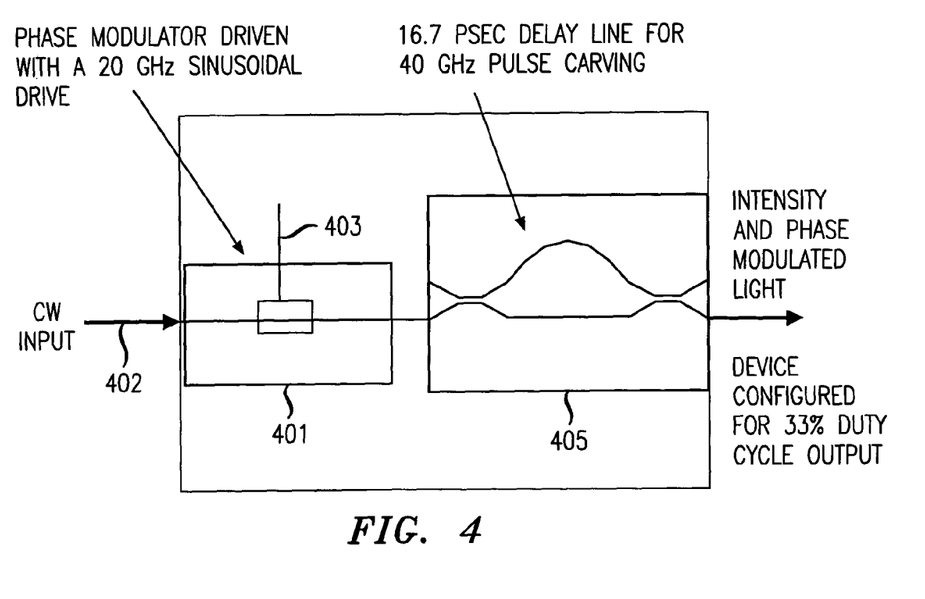
FIG. 4 is a schematic diagram of a phase modulator and delay interferometer combination that together constitute a 90 degree AP pulse generator in accordance with the present invention.

Another embodiment of the invention, as shown in FIG. 4, includes an optical phase modulator 401, the output of which is coupled to an appropriate delay interferometer 405. Modulator 401 illustratively receives a 1.5 micron wavelength CW input on line 402 and a 20 GHz sinusoidal drive signal on drive input 403, in order to generate the phase modulated output that is applied to interferometer 405. If the delay line in interferometer 405 is designed to create a time delay of 67% of the bit period, then driving the phase modulator with ~1.15*$V_\pi$ will produce a chirped 90 degree AP pulse stream containing 33% duty cycle pulses.

Figure 5:
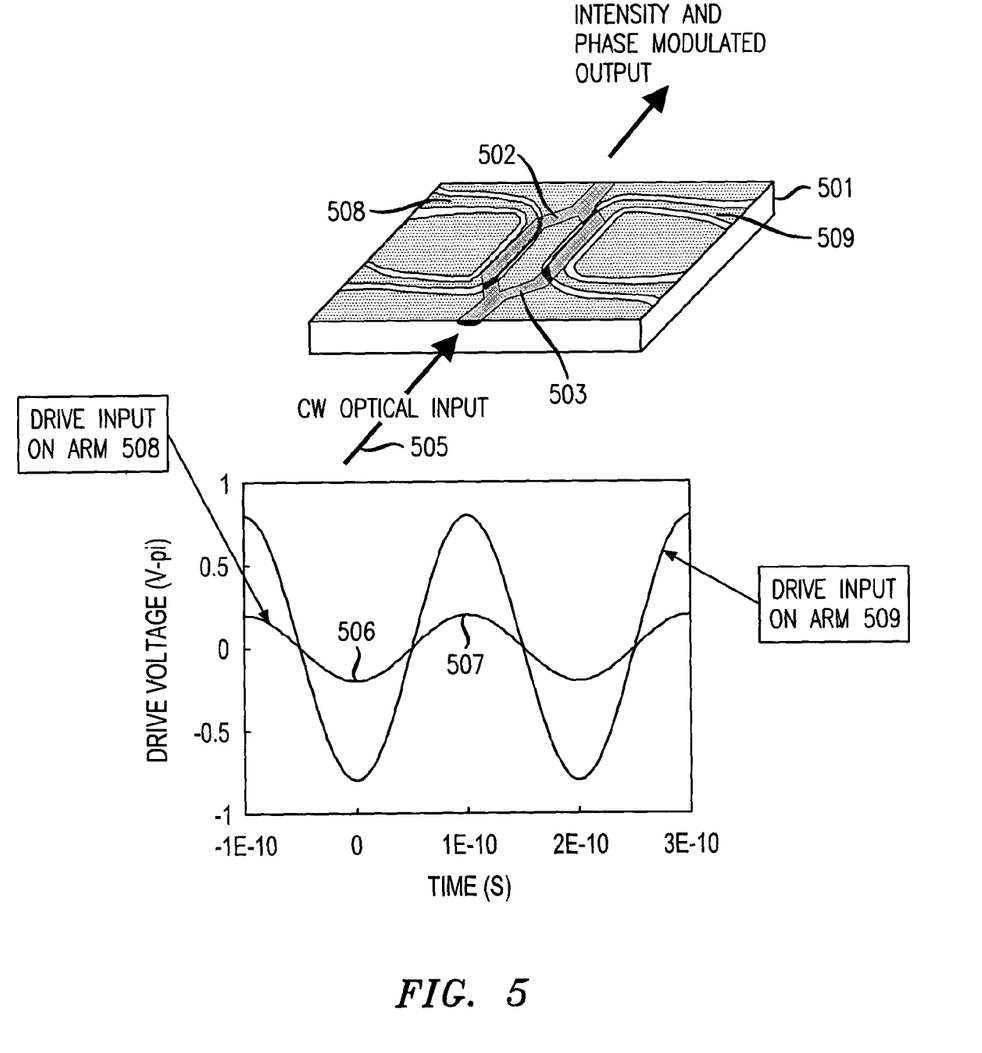
FIG. 5 is a diagram illustrating the relative drive voltage on each arm of a 67% duty cycle MZ modulator that can be used as a pulse generator to create a 90 degree AP pulse train in accordance with the present invention.

Referring now to FIG. 5, there is shown yet another arrangement for a balanced 2V-PG that produces a chirped 90 degree AP pulse stream, this arrangement having a 67% duty cycle. In this arrangement, the MZ modulator is fabricated on a substrate 501, and includes arms 502, 503 that each receive an equal portion of the CW optical input applied at input 505. Unequal drive power, represented by drive signals 506, 507, shown in the bottom portion of FIG. 5, are applied on each arm 502, 503 of the MZ modulator via coplanar waveguide electrodes 508, 509, respectively, to achieve the desired sinusoidal alternate chirp. We have found that the ideal drive imbalance in this case is to have a ratio of approximately 80% of the necessary phase shift on one arm of the MZ modulator, and approximately 20% of the phase shift needed on the other arm of the MZ modulator.

Figure 6:
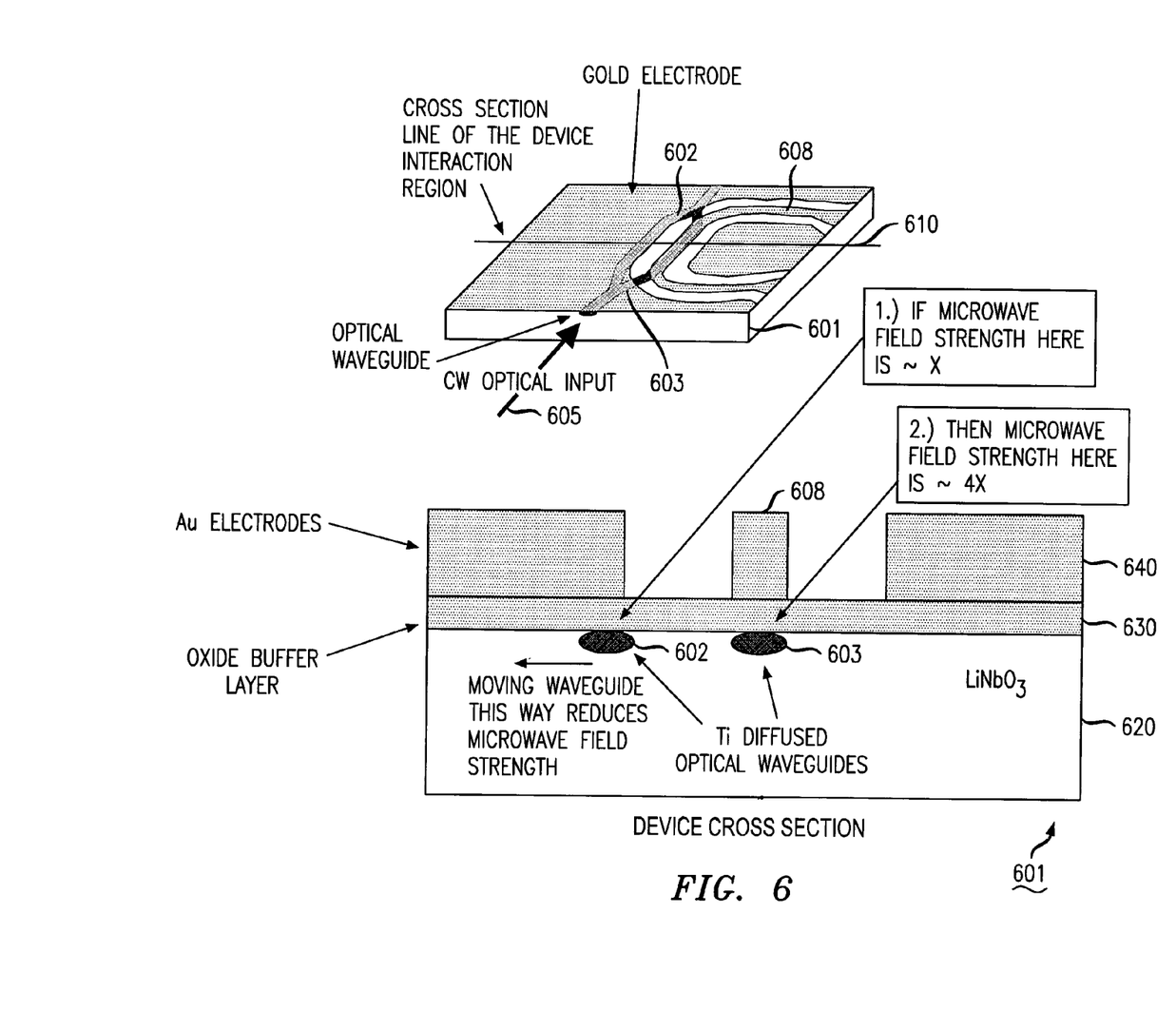
FIG. 6 is a schematic device diagram and a cross section of the interaction region of a single ended MZ modulator which, when driven as a 67% duty cycle pulse generator, generates a 90 degree AP pulse train in accordance with the present invention.

The MZ modulator of FIG. 5 is called "balanced" because the geometry is such that waveguides 508, 509 and arms 502, 503 are all symmetrical with respect to a longitudinal axis bisecting the MZ modulator. However, we have found that a chirped 90 degree AP pulse stream can also be achieved by using an unbalanced, single ended MZ modulator, as shown in FIG. 6. In this embodiment, a MZ modulator with arms 602, 603 is formed on substrate 601, and a single coplanar waveguide electrode (CPW) 608 is positioned asymmetrically so that applied drive signals affect each arm differently. A cross section taken along axis 610 is shown in the bottom portion of FIG. 6, and shows that the modulator arrangement includes a $LiNbO_3$ base layer 620 in which Ti diffused optical waveguides that form arms 602, 603 are located, and an oxide buffer layer 630 that separates base layer 620 from a top layer containing gold electrodes from which the CPW 608 is formed. The arrangement is advantageously designed to have a push-pull response, such that an 80:20 relative phase shift ratio is realized on the two arms 602, 603 of the MZ modulator. This is accomplished by appropriately positioning CPW 608 relative to arms 602, 603. This effect occurs because the microwave field strength on each waveguide arm 602, 603 is proportional to its distance from CPW 608. By adjusting the positioning so that the field strength on arm 603 is four times greater than that applied to arm 602, the desired 80:20 ratio can therefore be achieved.

Figure 7:
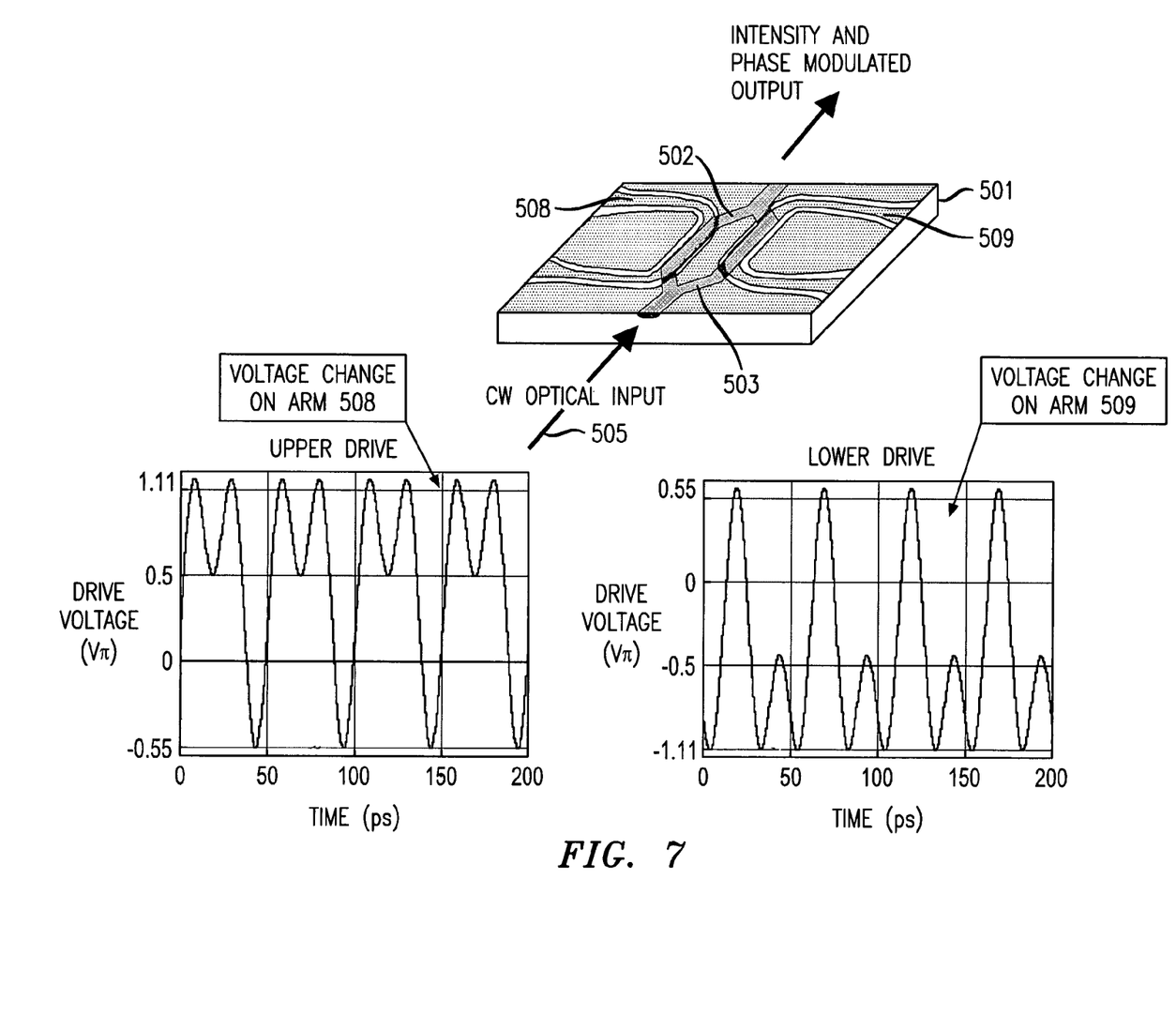
FIG. 7 is a schematic diagram of the microwave drive waveforms required on each arm of a balanced MZ modulator to create a 90 degree AP pulse train.

Turning now to FIG. 7, there is illustrated an arrangement for a 1*$V_{90}$ and 1*B pulse generator, i.e., a MZ modulator driven by a sinusoidal (or other periodic) microwave waveform of amplitude $V_\pi$ at a frequency equal to the data rate. The arrangement of the MZ modulator on the substrate is the same as shown in FIG. 5. However, in this embodiment, the drive signals applied to arms 502 and 503 via waveguides 508 and 509, respectively, have the waveforms shown in the bottom portion of FIG. 7, with an intensity modulation rate equal to the data rate and a sinusoidal phase modulation at half the data rate. The result is the desired chirped 90 degree AP pulse train.

While the preceding description focused on various arrangements for creating a chirped 90 degree AP pulse train, it is to be noted that, for some applications, it is advantageous to realize a phase flattened, or relatively chirp free, 90 degree AP pulse train, in which each pulse has a phase that is orthogonal to its nearest neighbor, while the phase across each pulse intensity profile is relatively flat, rather than sinusoidal. One such application is minimum shift keying (MSK) coding, which is described in a copending application entitled "System and Method of Optical Transmission" filed concurrently herewith on behalf of the present applicants, and assigned to the same assignee as the present invention. For that application, an MSK transmission format can easily and cost effectively be realized by first creating a relatively chirp free 90 degree AP pulse train, and then simply phase encoding the 90 degree AP pulse train with an appropriate coding scheme.

Without phase flattening, the alternating chirp between neighboring pulses in the chirped 90 degree AP pulse train degrades the performance of the delay interferometer used at the receiver end of the MSK transmission link. On the other hand, with phase flattening, the performance penalty caused by the delay interferometer is avoided because the alternating chirp between neighboring pulses is reduced and phase coding transmission using the MSK format is facilitated.

Figure 8A:
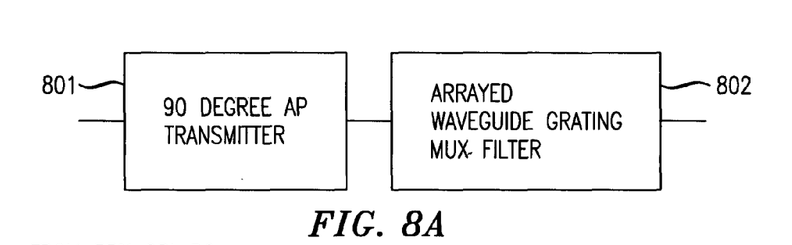
FIGS. 8A through 8C show an arrangement in accordance with the invention for creating a phase flattened 90 degree AP pulse train (FIG. 8A) and diagrams comparing the intensity and phase profile of a 90 degree AP pulse train (FIG. 8B) with a phase flattened 90 degree AP pulse train (FIG. 8C)
Figure 8B:
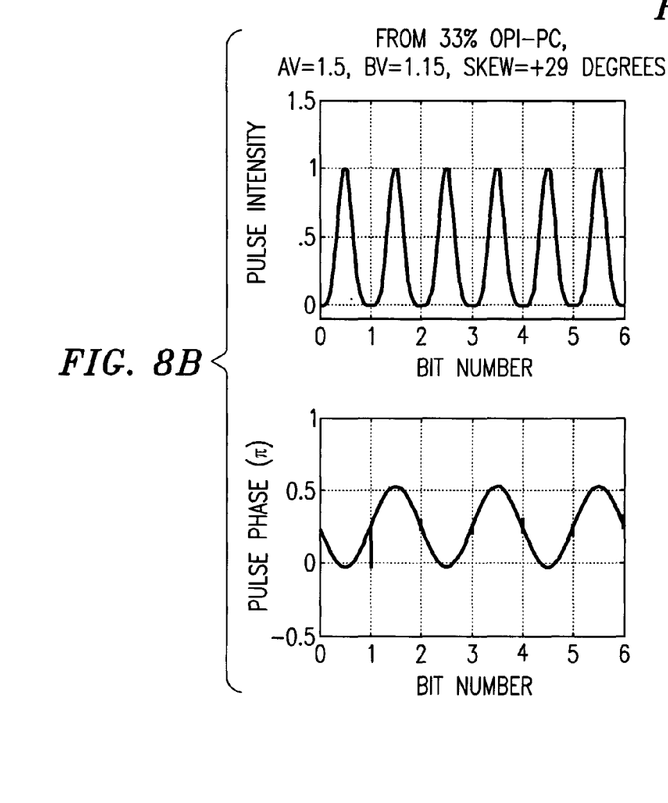
Figure 8C:
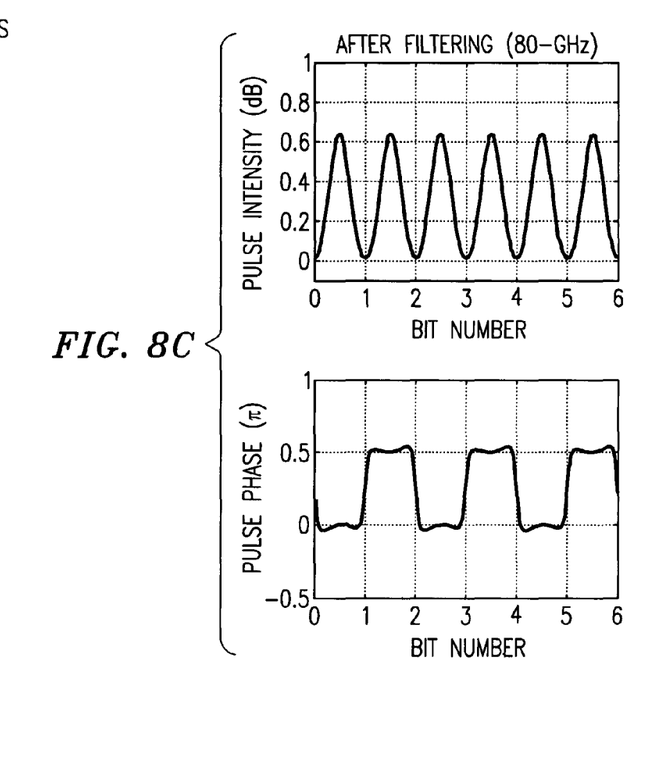

In accordance with an aspect of this invention, appropriate optical filtering of a chirped 90 degree AP pulse train in effect 'flattens' out the phase variation across the pulse profiles, thus creating a phase flattened 90 degree AP pulse train. For example, as shown in FIG. 8(a), an arrayed waveguide grating (AWG) optical MUX filter 802 can filter a chirped 90 degree AP pulse train output from an 90 degree alternate phase pulse generator 801 which is configured as shown in FIGS. 1, 3, 4, 5, 6 or 7. Filter 802 receives an input which has an intensity and phase shown in FIG. 8(b), and in essence, flattens out the phase across the intensity profile of the pulses within the 90 degree AP pulse train, yielding the output which has an intensity and phase shown in FIG. 8(c). This results in each pulse becoming relatively chirp free. However, each pulse still has a phase that is orthogonal to its nearest neighbor.

Even though the arrangement in the previous description performs filtering prior to data encoding, it is to be noted that performing chirp free phase or intensity coding of the chirped 90 degree AP pulse train first, and then optically filtering the data stream will also perform properly within an MSK transmission link.

Figure 9A:
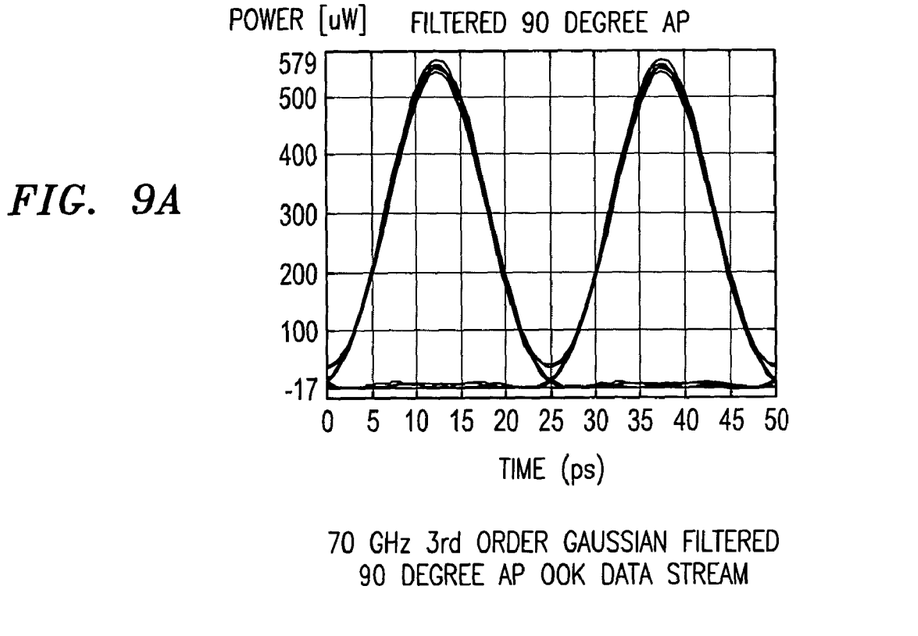
FIGS. 9A and 9B illustrate a comparison of the calculated eye diagrams for a (70 GHz $3^{rd}$ order Gaussian) filtered 90 degree AP OOK modulated data stream (FIG. 9A) and a filtered RZ OOK modulated data stream (FIG. 9B)
Figure 9B:
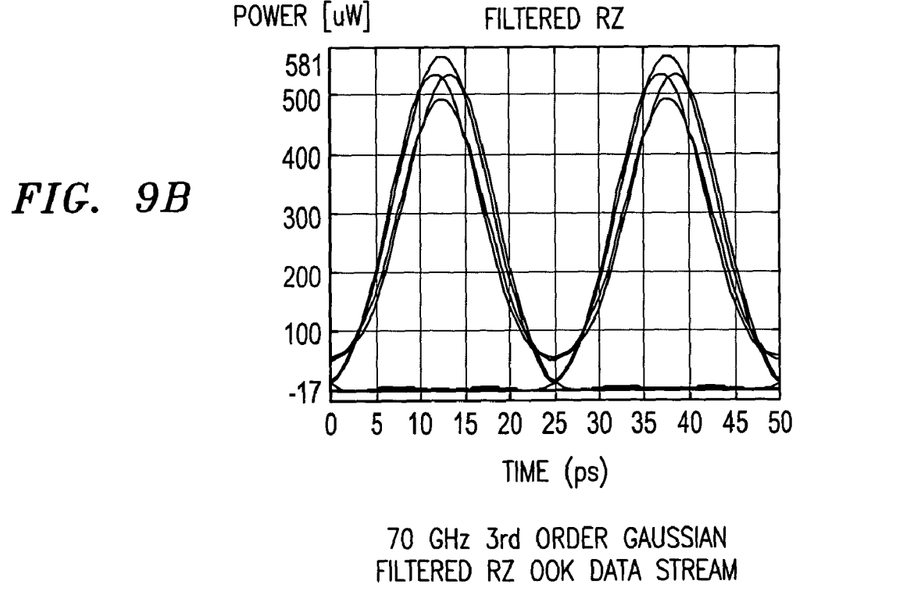

The 90 degree AP OOK transmission format used in accordance with the present invention can suppress inter symbol interference (ISI) and intra-channel FWM (e.g. ghost tone generation) and thereby significantly extend reach in high bit rate, long-haul fiber optic transmission systems. ISI is caused by pulse broadening, commonly the result of filtering of the RZ data stream, such that neighboring pulses overlap to some degree. If neighboring pulses are 90 degrees out of phase and overlap they will not interfere with each other since the phases of the two pulses are orthogonal, and their overlapping intensity profiles will simply add linearly. However, if the neighboring pulses are not 90 degrees out of phase and they overlap, they will interfere with each other and this will result in intensity fluctuations in the overlapping regions. The intensity fluctuations from the ISI can result in eye closure penalty in the RZ and CS-RZ transmission format that is not seen for the 90 degree AP transmission format. FIG. 9A shows a calculated eye diagram from a 90 degree AP OOK data stream that has been filtered by a 70 GHz $3^{rd}$ order Gaussian filter, and no eye closure due to ISI interference can be seen. In contrast, FIG. 9B shows a calculated eye diagram from an RZ OOK data stream that has been similarly filtered and eye closure penalty due to ISI can clearly be seen.

Figure 10A:
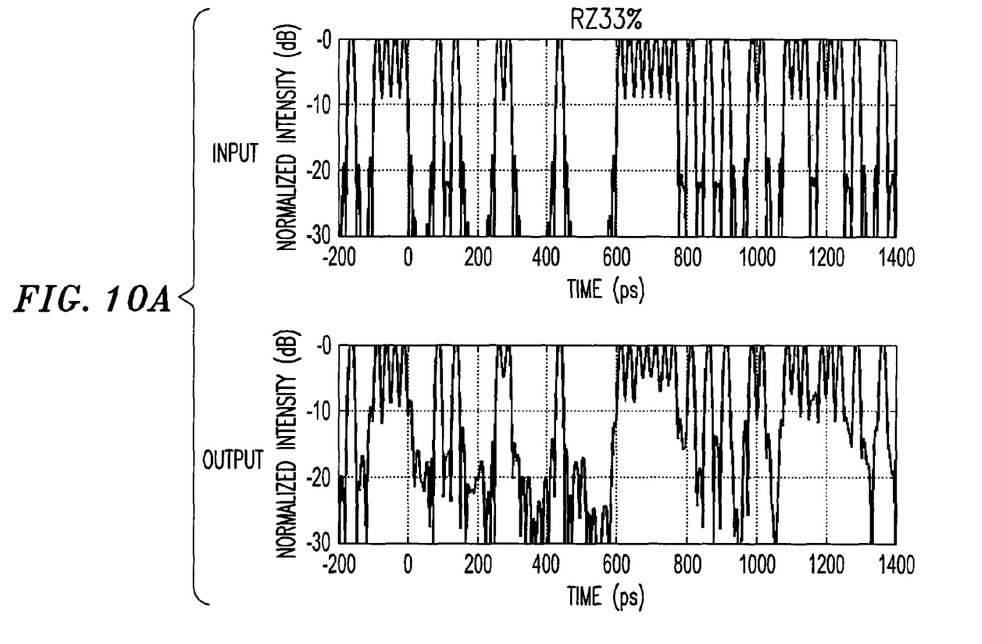
FIG. 10 shows the results from a simulation comparing an RZ 33% duty cycle bit pattern and a 90 degree AP 33% duty cycle bit pattern after a 2000 km transmission.
Figure 10B:
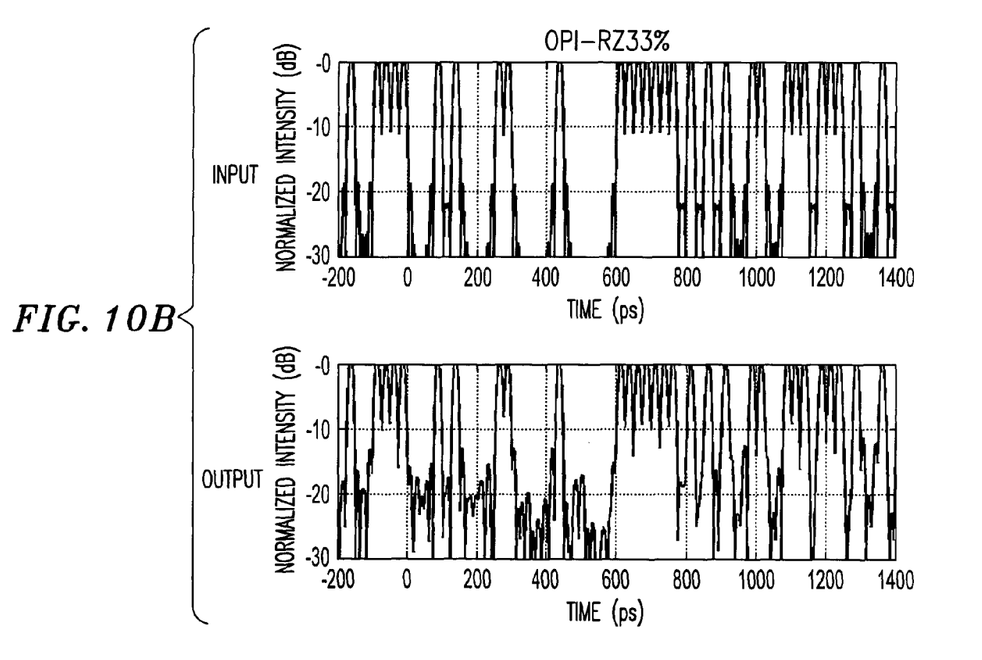
Figure 11:
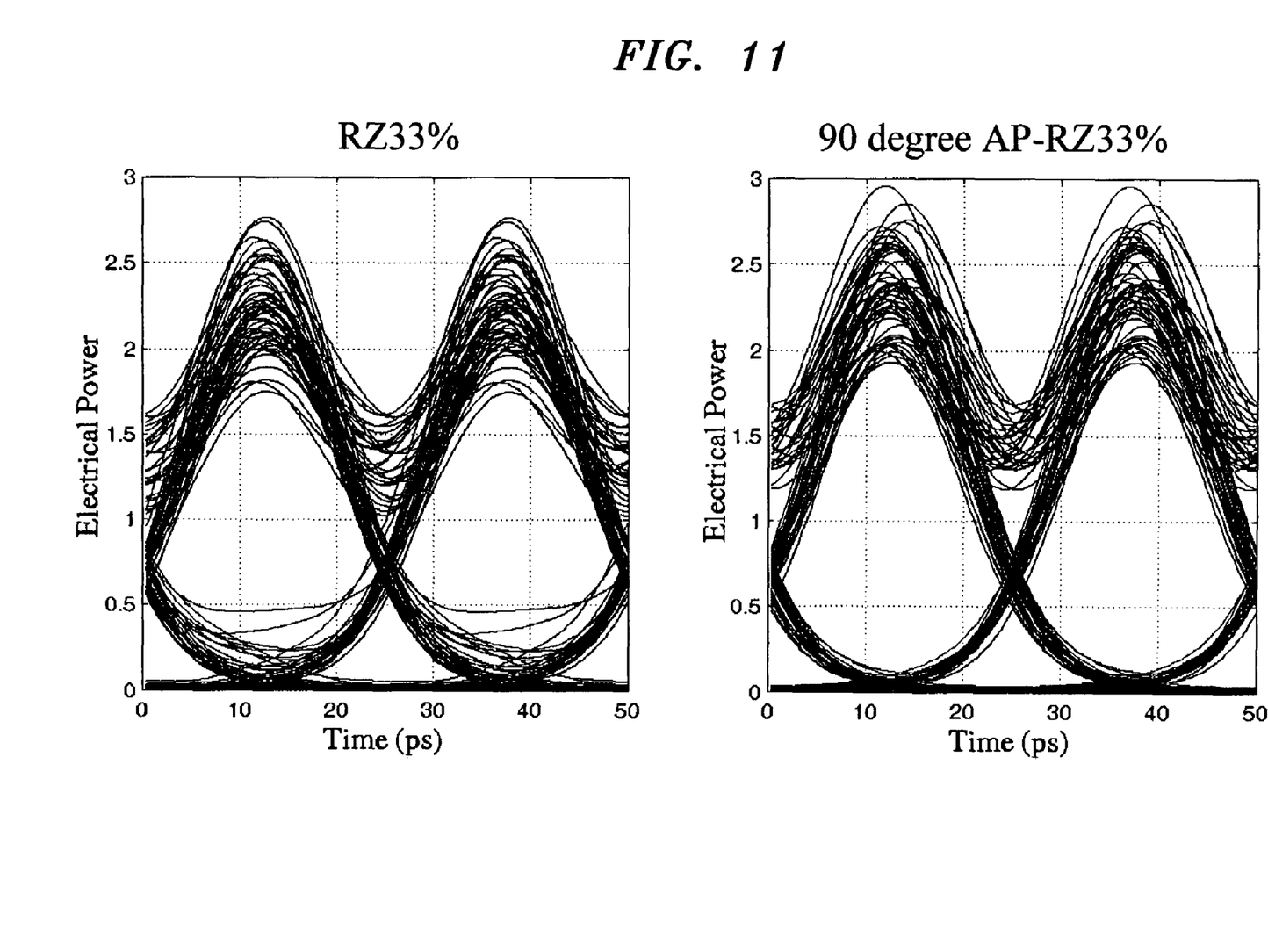
FIG. 11 shows the results from a simulation comparing eye diagrams from an RZ 33% duty cycle bit pattern and a 90 degree AP 33% duty cycle bit pattern after a 2000 km transmission.

The energy of a ghost pulse generated after transmission through a dispersion-managed fiber link depends on many factors, such as signal power, transmission distance, and dispersion map strength. In discussing the impact the 90 degree AP OOK transmission format has on the growth of ghost tones the example OOK bit sequence of '1110111' is considered. This particular bit sequence is chosen because the '0' bit in the middle of this sequence represents a 'worst-case' scenario for ghost pulse formation. Therefore, suppression of ghost pulse growth in this worst-case scenario is indicative of a reduction in nonlinear transmission penalty. FIG. 10 shows a simulation result comparing a typical 33% duty cycle RZ OOK bit pattern and a 33% duty cycle 90 degree AP RZ OOK bit pattern after a 2000 km transmission distance. Clear evidence of the improvement in the quality of the transmitted data can be seen in the 90 degree AP format as compared to the standard 33% RZ format. The improvement can be seen in two ways. First, the clear suppression of the 'worst case' ghost tone (FWM product) produced between the two marker blocks of three '1's on either side of a '0' can be seen in the 1150-to-1175 ps time slot through the use of the 90 degree AP OOK transmission format. Second, the long string of '1's that occupy the 600-to-775 ps time slot are much more uniform for the 90 degree AP OOK transmission format than in the case of the 33% RZ format. This is due to both the suppression of FWM and the lack of ISI in 90 degree AP OOK. Eye diagrams from these two transmission simulations are shown in FIGS. 11(a) and 11(b). A typical dispersion map based conventional non-zero dispersion shifted fiber spans is used in the simulations. The path averaged dispersion and pre-dispersion compensation are assumed to be 0.2 ps/km/nm, and −400 ps/nm, respectively. The launch power and optical signal-to-noise ratio (OSNR) are assumed to be −3 dBm/ch and 36.5 dB/span, respectively. The distinct improvement in eye opening of FIG. 11(b) (90 degree AP format) compared to FIG. 11(a) (standard RZ format) indicates that not only are the ghost tones suppressed but that the intensity variations between "1s" in the data pattern are also significantly reduced. We note that the suppression of the FWM products is similar when using a chirped 90 degree AP or phase flattened 90 degree AP transmission format.

Based upon the foregoing, it is seen that in accordance with the present invention, chirped 90 degree AP and phase flattened 90 degree AP pulse trains are useful for suppressing FWM and ISI in long haul OOK transmission systems, by creating appropriate phase relationships between neighboring pulses. The combination of phase and intensity modulation can be created with appropriate modulators or pulse generators, such that the optical phase at the intensity peak of each pulse is 90 degrees out of phase with its nearest neighbors. A chirped 90 degree AP pulse train can be transformed into a phase flattened 90 degree AP pulse train with appropriate optical filtering. In addition, the phase flattened 90 degree AP pulse train is particularly useful because it can conveniently be used to simply create an MSK transmission format.

We claim:

1. An apparatus for generating an optical carrier signal for a long-haul fiber optic transmission system, said apparatus comprising:

a pulse generator including a phase modulator having a driving electrode, an input optical port and an output optical port, said output port optically coupled to an input optical port of a delay interferometer;

a radio frequency electrical drive signal applied to the driving electrode for phase modulating a continuous wave (CW) input light applied to the input port of the phase modulator;

the input port of the delay interferometer optically coupled to a first and a second light path, such that a time delay exhibited between the light paths is substantially ⅔ of the bit period of a data stream to be transmitted by the system, the light paths being optically coupled to an output port of the delay interferometer; and wherein a 90-degree AP optical carrier signal is produced at the output port of the delay interferometer and each output pulse of the carrier signal has an optical phase difference of substantially 90 degrees relative to an adjacent pulse.

2. The apparatus defined in claim 1 wherein the electrical drive signal exhibits a rate that is substantially one-half the desired data transmission rate.

3. The apparatus defined in claim 1, wherein the maximum phase modulation of 90-degree AP output pulses occurs at the intensity peak of each pulse.

4. The apparatus defined in claim 1 further including an output optical filter such that 90-degree AP output pulses are rendered substantially phase flattened (nearly chirp free) after passing through the filter.

5. A method for generating 90-degree AP carrier pulses, said method comprising the steps of:
   providing a continuous wave (CW) input light to an input port of a phase modulator;
   modulating the phase of the input light by applying a radio frequency electrical drive signal to the phase modulator to generate a phase modulated signal;
   passing the phase modulated signal through a delay interferometer, wherein the delay is set to approximately $\tfrac{2}{3}$ of the bit period of the data rate in the input data stream; and
   generating a 90-degree AP optical carrier signal at the output of the delay interferometer such that each pulse in said carrier signal has an optical phase difference of substantially 90 degrees relative to an adjacent pulse.

6. The method defined in claim 5 wherein said applying of the drive signal is performed at a rate substantially equal to one-half the desired data transmission rate.

7. The method defined in claim 5 further including the step of phase flattening the optical pulses in the 90-degree AP carrier signal using an output optical filter.

* * * * *